(12) United States Patent
Campbell et al.

(10) Patent No.: US 9,172,626 B2
(45) Date of Patent: Oct. 27, 2015

(54) METHODS, SYSTEMS, AND COMPUTER READABLE MEDIA FOR PREVENTING TRAFFIC CONGESTION WITHIN A LONG TERM EVOLUTION (LTE) MULTI-USER EQUIPMENT (MULTI-UE) SIMULATOR DEVICE

(75) Inventors: Damon Lee Campbell, San Carlos, CA (US); David Hammond, Morrisville, NC (US); William Clarry Hough, Raleigh, NC (US); Eric Hugh Wilke, Raleigh, NC (US)

(73) Assignee: Ixia, Calabasas, CA (US)

( * ) Notice: Subject to any disclaimer, the term of this patent is extended or adjusted under 35 U.S.C. 154(b) by 725 days.

(21) Appl. No.: 13/418,076

(22) Filed: Mar. 12, 2012

(65) Prior Publication Data

US 2013/0235727 A1 Sep. 12, 2013

(51) Int. Cl.
  *H04L 12/26* (2006.01)
  *H04W 24/06* (2009.01)

(52) U.S. Cl.
  CPC ............... *H04L 43/10* (2013.01); *H04L 43/12* (2013.01); *H04L 43/50* (2013.01); *H04W 24/06* (2013.01)

(58) Field of Classification Search
  None
  See application file for complete search history.

(56) References Cited

U.S. PATENT DOCUMENTS

| | | | |
|---|---|---|---|
| 7,286,802 B2 | 10/2007 | Beyme et al. | |
| 7,570,922 B2 | 8/2009 | Williams | |
| 7,706,347 B2 | 4/2010 | Kim et al. | |
| 7,813,262 B1 | 10/2010 | Rao | |
| 7,856,029 B2 | 12/2010 | Osterling et al. | |
| 8,229,416 B2 | 7/2012 | Akman et al. | |
| 2005/0220047 A1 | 10/2005 | Baey et al. | |
| 2010/0075678 A1 | 3/2010 | Akman et al. | |
| 2013/0184023 A1 | 7/2013 | Asokan et al. | |
| 2014/0185425 A1 | 7/2014 | Kim et al. | |

FOREIGN PATENT DOCUMENTS

WO  WO 03/069814 A2  8/2003

OTHER PUBLICATIONS

Rosenberg, J. et al. "SIP: Session Initiation Protocol", RFC 3261, Jun. 2002.*
Notice of Allowance and Fee(s) Due for U.S. Appl. No. 12/337,285 (Mar. 19, 2012).
Final Office Action for U.S. Appl. No. 12/337,285 (Oct. 24, 2011).
(Continued)

*Primary Examiner* — Timothy J Weidner
(74) *Attorney, Agent, or Firm* — Jenkins, Wilson, Taylor & Hunt, P.A.

(57) ABSTRACT

Methods, systems, and computer readable media for preventing traffic congestion in a long term evolution (LTE) multi-user equipment (multi-UE) simulator device are disclosed. In one example, a method includes transmitting, from a first module to a second module over a shared bus, one of a plurality of LTE subframe signal portions at the beginning of a first transmission interval. The method further includes sending, from the first module to a third module over the shared bus, a trigger signal upon completing the transmission of the LTE signal portion. The method also includes forwarding, from the third module to the second module over the shared bus, decoded control information associated with at least one of the plurality of LTE subframe signal portions during an idle time period defined by the receipt of the trigger signal and the beginning of a second transmission interval.

19 Claims, 3 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).

Non-Final Office Action for U.S. Appl. No. 12/337,285 (Apr. 25, 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

"Coding of Speech at 8 kbit/s Using Conjuate-Structure Algebraic-Code-Excited Linear Prediction (CS-ACELP)," ITU-T, G.729, pp. 1-146 (Jan. 2007).

"Common Public Radio Interface (CPRI); Interface Specification," CPRI Specification V2.0, pp. 1-75 (Oct. 1, 2004).

Sjoberg et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group, RFC 3267 (Jun. 2002).

"40, 32, 24, 16 kbit/s Adaptive Differential Pulse Code Modulation (ADPCM)," CCITT, G.726, pp. 1-59 (1990).

"Pulse Code Modulation (PCM) of Voice Frequencies," ITU-T G.711, pp. 1-12 (Copyright 1988).

Notice of Allowance and Fee(s) Due for U.S. Appl. No. 13/352,058 (Feb. 5, 2015).

Non-Final Office Action for U.S. Appl. No. 13/352,058 (Aug. 4, 2014).

* cited by examiner

METHODS, SYSTEMS, AND COMPUTER READABLE MEDIA FOR PREVENTING TRAFFIC CONGESTION WITHIN A LONG TERM EVOLUTION (LTE) MULTI-USER EQUIPMENT (MULTI-UE) SIMULATOR DEVICE

TECHNICAL FIELD

The subject matter described herein relates to simulating long term evolution (LTE) user devices for testing telecommunications network equipment. More specifically, the subject matter relates to methods, systems, and computer readable media for preventing traffic congestion within an LTE multi-user equipment (multi-UE) simulator device.

BACKGROUND

In response to growing customer demand for mobile data, the 3rd Generation Partnership Project (3GPP) defined specifications for an improved IP-based network called the LTE network. LTE promises true mobile broadband by delivering peak user data rates of ups to 300 Mbps on the downlink and 150 Mbps on the uplink, with user plane latency of less than 5 ms.

Long term evolution and other radio communications technologies can require significant infrastructure and configuration. Generally, network operators test various aspects of their network equipment to ensure reliable and efficient operation. Network operators typically simulate various conditions before equipment is deployed in a live network to decrease avoidable delays and other problems. Comprehensive testing with realistic network scenarios and user traffic is critical in validating the eNode B performs to specifications on initial deployment. This presents many new testing challenges which may be addressed by utilizing user equipment simulation testing systems. The UE simulation testing systems may be configured to generate various levels of data traffic that simulates capacity or overload conditions that may be experienced by an eNode B.

The generation of data traffic to conduct such stress tests, however, can cause problems within an LTE multi-UE simulator node itself. For example, multiple components within an LTE multi-UE simulator node simultaneously send data to the same endpoint via the device's backplane or bus. As a result, bus collisions occur, which cause traffic throughput to be reduced and/or transmitted data to be corrupted. For instance, two different modules within an LTE multi-UE simulator node may both write data over the shared bus to the downlink signal chain field programmable gate array at or near the same time.

Accordingly, in light of these difficulties, a need exists for improved methods, systems, and computer readable media for preventing traffic congestion within an LTE multi-UE simulator device.

SUMMARY

Methods, systems, and computer readable media preventing traffic congestion within a network testing node are disclosed. According to one embodiment, the method includes transmitting, from a first module to a second module over a shared bus, one of a plurality of LTE subframe signal portions at the beginning of a first transmission interval. The method further includes sending, from the first module to a third module over the shared bus, a trigger signal upon completing the transmission of the LTE signal portion. The method also includes forwarding, from the third module to the second module over the shared bus, decoded control information associated with at least one of the plurality of LTE subframe signal portions during an idle time period defined by the receipt of the trigger signal and the beginning of a second transmission interval.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein. In one embodiment, a module may include a field programmable gate array.

BRIEF DESCRIPTION OF THE DRAWINGS

The subject matter described herein will now be explained with reference to the accompanying drawings of which.

DETAILED DESCRIPTION

The subject matter described herein discloses for preventing traffic congestion within an LTE multi-UE simulator device. Reference will now be made in detail to exemplary embodiments of the present invention, examples of which are illustrated in the accompanying drawings. Wherever possible, the same reference numbers will be used throughout the drawings to refer to the same or like parts.

Figure 1:
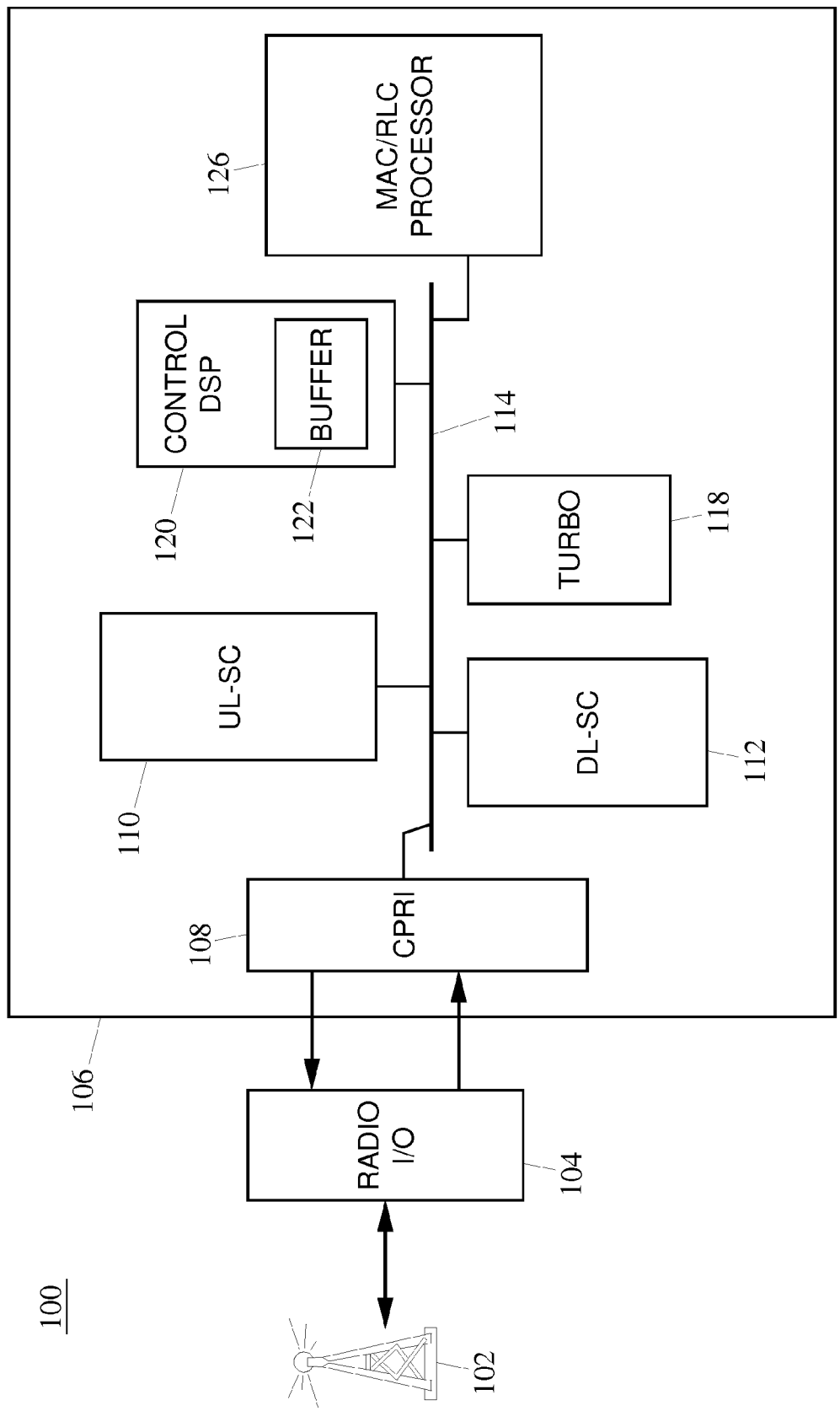
FIG. 1 is a block diagram illustrating an exemplary network that includes an LTE multi-UE simulator device according to an embodiment of the subject matter described herein.

FIG. 1 is a diagram illustrating an exemplary LTE network 100. LTE network 100 may include an evolved node B (eNode B) 102, a radio interface device 104, and an LTE UE simulation device 106. In one embodiment, eNode B 102 may represent any suitable entity for providing data via an air interface, such as a base transceiver station (BTS) and the like. For example, eNode B 102 may be an LTE mobile network entity having functionality similar to that of a radio network controller (RNC) and a base station (BS) in 2G networks or an RNC and a Node B in 3G mobile networks. In some embodiments, eNode B 102 communicates with simulation device 106 via radio interface device 104. The signals from radio interface device 104 are decoded and processed by a common public radio interface (CPRI) processing module 108, which processes both downlink data, i.e., data from eNode B 102 to UE simulation device 106 and uplink data, i.e., data from the UE simulation device 106 to eNode B 102.

In one embodiment, radio interface device 104 may be configured for controlling and/or performing radio I/O functions, such as transmitting or receiving communications from eNode B 102 or simulation device 106. Radio interface device 104 may either be integrated with simulation device 106 or be a separate and distinct from simulation device 106. In one embodiment, radio interface device 104 may be configured to perform analog-to-digital/digital-to-analog conversion on data communicated between eNode B 102 and simulation device 106. Radio interface device 104 may also include operation and management processing capabilities and a standardized optical interface to establish a connection with simulation device 106. For example, radio interface device 104 may be connected to simulation device 106 via a fiber optic cable using Common Public Radio Interface (CPRI) protocol. Data transmitted over a CPRI link may consist of digitized samples of the analog baseband signal, plus a low bandwidth control channel. Data carried over the CPRI link may include a continuous stream of numbers that represent digitized samples of a baseband waveform. In one embodiment, radio interface device 104 may forward downlink data to simulation device 106 over a CPRI link via OFDM signaling.

In one embodiment, UE simulation device 106 comprises a server or other node that can be communicatively connected to at least one eNode B 102 via radio interface device 104 in network 100 for testing purposes. For example, simulation device 106 may be any suitable entity (e.g., a stand-alone node or distributed multi-node system) configured to simulate one or more LTE UEs, send communications to eNode B 102, receive communications from eNode B 102, and/or test communications capabilities of eNode B 102. Namely, simulation device 106 may be used for simulating network load conditions and analyzing performance of eNode B 102 and/or network nodes under the simulated conditions. In some embodiments, simulation device 106 may be a single node or may be distributed across multiple computing platforms or nodes.

Simulation device 106 may include various modules for performing one or more aspects described herein. In one embodiment, simulation device 106 may include a common public radio interface (CPRI) processing module 108, an uplink signal chain (DL-SC) module 110, a downlink signal chain (DL-SC) module 112, a turbo encoder module 118, a control digital signal processor (DSP) 120, and a hardware-based processing unit 126, which are all communicatively connected to each other via a shared bus 114. In one embodiment, the aforementioned modules may comprise various components, such as a field-programmable gateway array (FPGA), an application-specific integrated circuit (ASIC), software executed by a processor, or any other type of hardware and/or software based modules. In one embodiment, shared bus 114 includes a Serial Rapid Input/Output (SRIO) bus. In one embodiment, shared bus 114 may include a backplane of simulation device 106.

In one embodiment, CPRI module 108 may be any suitable entity (e.g., a communications interface) for communicating with radio interface device 104 and/or other components within simulation device 106 via a CPRI protocol. For example, CPRI module 108 may receive downlink data from radio interface device 104. In one embodiment, the data may be transmitted by radio interface device via an OFDM signal. On the downlink, CPRI module 108 may be configured to partition the received OFDM signal into digital data portions, such as symbols.

For example, CPRI module 108 may convert an OFDM signal and periodically (e.g., approximately every seventy microseconds) provide a digital data portion to other modules in simulation device 106. Generally, receiving modules may attempt to process a digital data portion (e.g., a symbol) prior to another digitalized data portion being provided by CPRI module 108.

For example, CPRI module 108 may transmit a symbol to DL-SC module 112 on a periodic basis. In one embodiment, DL-SC module 112 may be any suitable entity (e.g., an ASIC, an FPGA, or software executing on a processor) used in processing digital data portions (e.g., eNode B traffic data), such as symbols, received from CPRI module 108. DL-SC module 112 may also be configured to perform one or more aspects associated with downlink baseband processing for data transmitted from eNode B 102. DL-SC module 112 may also perform data integrity operations (e.g., checking and removing CRC values), LTE channel data de-mapping or decoding, de-multiplexing operations, and/or other data processing.

In one embodiment, downlink data is sent to a DL-SC module 112, which separates the downlink data into different logical channels, which in turn may be processed by separate physical channels within the UE. Two of the logical channels are the physical downlink shared channel (PDSCH) and the physical downlink control channel that contains the downlink control information (DCI). Downlink shared channel data, such as the voice data of a telephone call, is processed by first segmenting the bit stream into code blocks, performing channel decoding, and then sending the decoded data to a media access control (MAC) layer at processor module 126. The eNode B 102 uses the DCI to indicate to each UE what scheduled resources for uplink and downlink are available to that UE. Downlink control information received by simulation device 106 is forwarded to DL-SC module 112, which processes the received DCI to determine, among other things, what resources (e.g., frequencies, time slots, etc.) that eNode B 102 is permitting simulation device 106 to use for uplink and downlink, which is referred to as "grant" information, because eNode B 102 is granting the use of a specified subset of transmission resources to simulation device 106.

In one embodiment, UL-SC module 110 may be any suitable entity (e.g., an ASIC, an FPGA, or software executed on a processor) used in processing simulated UE traffic data. For example, UL-SC module 110 may perform one or more aspects associated with uplink baseband processing for data transmission towards eNode B 102. Uplink data is provided by processor 126 (i.e., the MAC) in groups of data called transport blocks. The size of the transport block provided by processor 126 is defined or determined by the grant information received from eNode B 102. For each transport block, a CRC is generated before the transport block is split or segmented into smaller code blocks. The code blocks are then processed into frames which are sent to CPRI module 108 and transmitted via radio interface device 104 to eNode B 102.

In one embodiment, turbo module 118 may be any suitable entity (e.g., an FPGA, an ASIC, or software executing on a processor) used in processing downlink data. For example, turbo module 118 may perform one or more channel decoder aspects associated with downlink baseband processing. Turbo module 118 may perform transport block processing, data integrity operations (e.g., checking and removing CRC values), code de-segmentation, and/or other data processing. Turbo module 118 may provide data to other modules, such as DSP module 120 or processing module 126.

Control DSP module 120 may be any suitable entity (e.g., an ASIC, an FPGA, or software executing on a processor) used in processing various data. For example, DSP module 120 may perform one or more aspects associated with uplink baseband processing and/or downlink baseband processing. Control DSP module 120 may act as an access controller and may provide data to processing module 126. In one embodiment, control DSP module 120 may include receive control information associated with a data portion (e.g., a radio subframe). Control DSP module 120 may also determine a channel delineation map identifier using at least a portion of the received control information and may send the channel delineation map identifier to the downlink decoder module.

Media access control (MAC)/radio link control (RLC) processing module 126 may be any suitable entity for performing various actions, such as interfacing with higher layers involved in LTE communications and data processing. For example, processing module 126 may perform medium access control (MAC) and radio link control (RLC) processing. Processing module 126 may receive decoded downlink data and send the data to the upper layers (e.g., packet data convergence protocol (PDCP) layer). Processing module 126 may also receive uplink data from the upper layers (e.g., the MAC layer). The uplink data may be sent to other modules, e.g., control DSP module 120 and/or UL-SC 110, for appropriate processing.

In one embodiment, the aforementioned modules within simulation device 106 are communicatively connected via a shared bus 114. For example, control DSP module 120, UL-SC 110, and CPRI module 108 may transmit signaling messages on shared bus 114. However, if any of control DSP module 120, UL-SC 110, and CPRI module 108 simultaneously transmits data to the same destination on shared bus 114, bus collisions may be experienced. Notably, bus collisions may cause signaling traffic throughput along shared bus 114 to be reduced. Similarly, the transmitted signaling data may also become corrupted. The present subject matter describes an exemplary signaling mechanism or protocol that prevents traffic congestion in simulation device 106.

Figure 2:
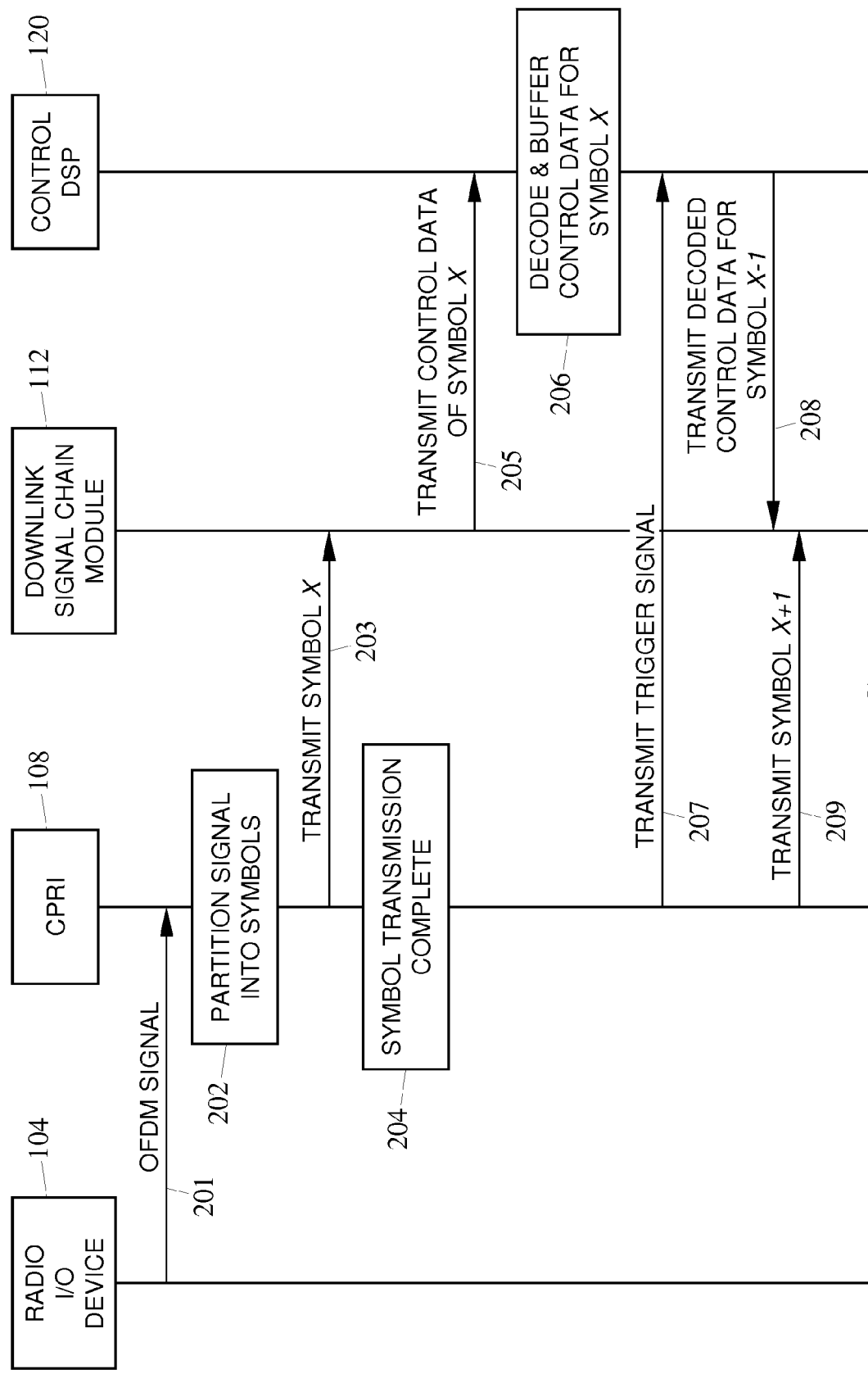
FIG. 2 is a diagram illustrating an exemplary signaling sequence associated with preventing traffic congestion within an LTE multi-UE simulator device according to an embodiment of the subject matter described herein.

FIG. 2 is a diagram illustrating an exemplary signaling sequence associated with preventing traffic congestion within an LTE multi-UE simulator device according to an embodiment of the subject matter described herein. In one embodiment, radio interface device 104 receives an LTE signal data as downlink data from eNode B 102. Radio interface device 104 may then convert the received LTE signal data into a digital orthogonal frequency division multiplexing (OFDM) signal. Afterwards, radio interface device 104 may be configured to forward the OFDM signal to CPRI module 108 (see message 201 in FIG. 2).

After receiving the OFDM signal from radio interface device 104, CPRI module 108 may be configured to divide the OFDM signal into a plurality of digital LTE subframes. Each of the digital LTE subframes may then be further partitioned by the CPRI module 108 into LTE subframe portions, such as OFDM symbols (see block 202 in FIG. 2). In one embodiment, a digital LTE subframe includes a one millisecond subframe comprising fourteen (14) OFDM symbols.

After partitioning the LTE subframes into subframe portions, such as symbols, CPRI module 108 may be configured to transmit a subframe portion (e.g., message 203) to DL-SC module 112 at the beginning of a transmission interval. In one embodiment, a transmission interval occurs once approximately every 70 microseconds (e.g., 71.4 microseconds). For example, because the transmission duration of a subframe portion does not take the full 71.4 microseconds, a fixed amount of idle time exists between the transmission of each symbol (e.g., the time period existing between the end of transmission of a first symbol and the beginning of the transmission of a second symbol. In one embodiment, a subframe portion message 203 may be transmitted within simulation device 106 over internal shared bus 114 to DL-SC module 112 (i.e., the beginning of a first transmission interval).

Upon completion the transmission of symbol "X" (see block 204), DL-SC module 112 may initiate the analysis of the received symbol in order to determine how the received subframe portion should be handled. The process may entail DL-SC module 112 transmitting downlink control information (see message 205 in FIG. 2) associated with the received symbol to control DSP module 120 for decoding.

Upon receiving the control information from DL-SC module 112, control DSP module 120 analyzes and decodes the received control information. Afterwards, control DSP module 120 temporarily stores the decoded control information for symbol "X" in a local buffer 122 (see block 206). Namely, the decoded control information is stored in buffer 122 until CPRI module 108 sends a trigger signal to control DSP module 120.

As mentioned above, CPRI module 108 transmits a symbol to DL-SC module 112. After the symbol transmission is complete, CPRI module 108 may transmit a trigger signal message 207 to control DSP module 120 over shared bus 114. In one embodiment, the trigger signal message 207 includes a Serial Rapid Input/Output (SRIO) write message that indicates that the transmission of the most recent subframe portion to downlink signal chain module 112 is complete. Notably, trigger signal message 207 may include any message used to notify control DSP module 120 to send decoded control information associated with the downlink data to DL-SC 112 over shared bus 114. Control DSP module 120 may be configured to withhold the decoded control information (e.g., storing the data in buffer 122) from DL-SC module 112 until control DSP module 120 receives the trigger message from CPRI module 108 over shared bus 114.

Upon receipt of trigger signal message 207, control DSP module 120 may then forward the decoded downlink control information to DL-SC module 112 via shared bus 114 (see message 208 in FIG. 2). The forwarded decoded control information may be associated with a symbol "X". In one embodiment, the decoded control data being forwarded to DL-SC module 112 corresponds to symbol control information previously received, decoded, and stored in buffer 122. Notably, by utilizing trigger signal message 207, simulation device 106 is able to coordinate and manage the amount of signal traffic that traverses shared bus 114. By utilizing this traffic management mechanism, problems such as bus collisions and data corruption may be prevented.

At the end of the first transmission interval (e.g., approximately 71.4 microseconds from the time signal message 203 is transmitted), the process is repeated and CPRI module 108 initiates a second transmission interval by sending a symbol "X+1" to DL-SC chain module 112 (see message 209 in FIG. 2).

Figure 3:
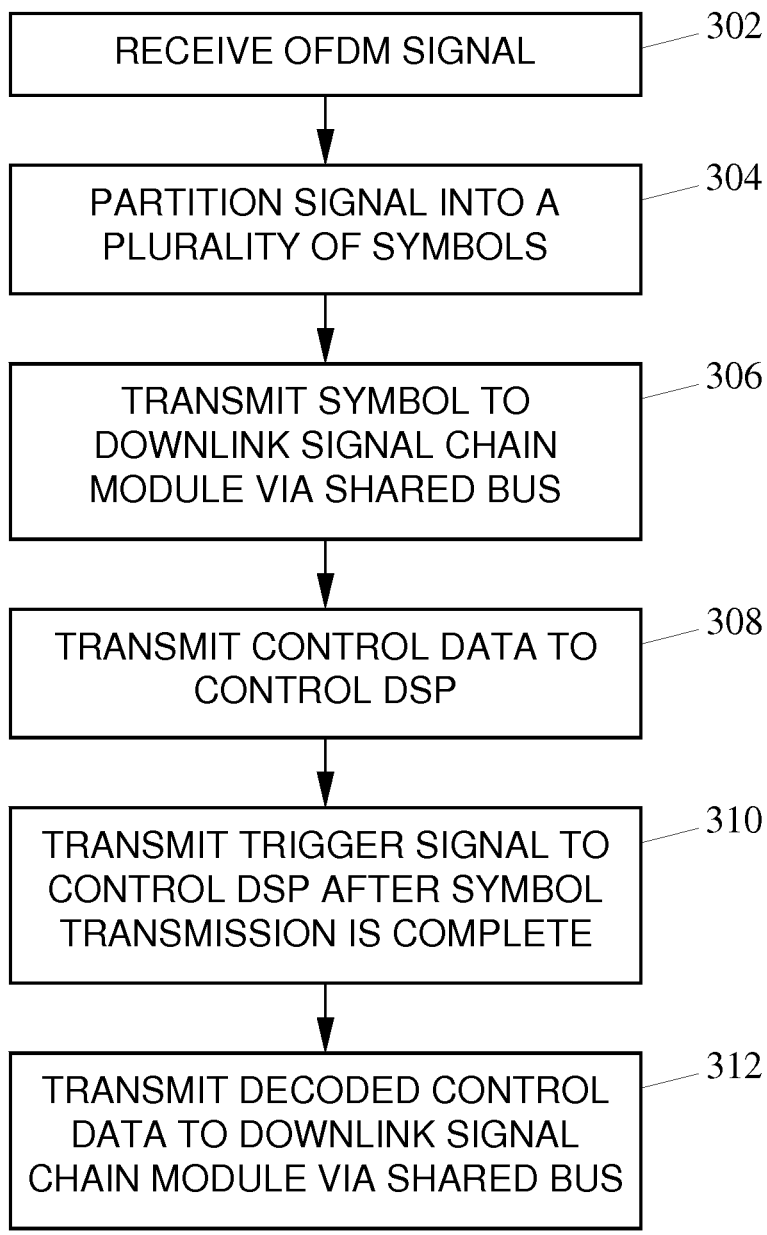
FIG. 3 is a flow chart illustrating an exemplary process for preventing traffic congestion within an LTE multi-UE simulator device according to an embodiment of the subject matter described herein.

FIG. 3 is a flow chart illustrating an exemplary process for preventing traffic congestion in an LTE multi-UE simulator device according to an embodiment of the subject matter described herein.

In block 302, an OFDM signal is received. In one embodiment, CPRI module 108 receives an OFDM signal containing downlink data from radio interface 104.

In block 304, the OFDM signal is partitioned or divided into a plurality of LTE subframe signal portions. In one embodiment, CPRI module 108 partitions the OFDM signal into LTE subframes and further divides the LTE subframes into subframe signal portions (e.g., symbols).

In block 306, the subframe signal portion (i.e., a symbol) is transmitted. In one embodiment, CPRI module 108 forwards the symbol at the beginning of a first transmission interval to DL-SC module 112 for further processing. In one embodiment, the symbol contains encoded downlink data.

In block 308, the encoded control data is transmitted. In one embodiment, DL-SC module 112 forwards the encoded control data contained in the symbol to control DSP module 120.

In block 310, a trigger signal is transmitted. In one embodiment, upon the completing the transmission of the subframe signal portion to DL-SC module 112, CPRI module 108 forwards a trigger signal to control DSP module 120 over shared bus 114. In one embodiment, the trigger signal includes a Serial Rapid Input/Output (SRIO) write command.

In block 312, decoded control information is transmitted. In one embodiment, in response to the receipt of the trigger signal, control DSP module 120 transmits decoded control information to DL-SC module 112 over shared bus 114. Notably, the decoded control information is transmitted to DL-SC module 112 over shared bus 114 during an idle time period defined by the sending of the trigger signal and the beginning of a second transmission interval (i.e., in which a second subframe portion is sent by CPRI module 108 to DL-SC module 112).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:
in a long term evolution (LTE) multi-user equipment (multi-UE) simulator device,
receiving, at a first module, LTE downlink data from a radio interface;
dividing the LTE downlink data into a plurality of LTE subframe signal portions;
transmitting, from a first module to a second module over a shared bus, one of the plurality of LTE subframe signal portions at the beginning of a first transmission interval;
sending, from the first module to a third module over the shared bus, a trigger signal upon completing the transmission of the LTE signal portion; and
forwarding, from the third module to the second module over the shared bus during an idle time period within the first transmission interval and after the completed transmission of the LTE signal portion, decoded control information associated with at least one of the plurality of LTE subframe signal portions, wherein the idle time period is defined by the sending of the trigger signal and the beginning of a second transmission interval initiated at the end of the first transmission interval, and wherein the trigger signal and the decoded control information are communicated separately from the plurality of LTE subframe signal portions.

2. The method of claim 1 comprising sending, from the second module to the third module over the shared bus, encoded downlink information to be processed into the decoded control information.

3. The method of claim 1 wherein the first module includes a common public radio interface (CPRI) field programmable gate array (FPGA).

4. The method of claim 1 wherein the second module includes a downlink signal chain field programmable gate array (FPGA).

5. The method of claim 1 wherein the third module includes a control digital signal processor (DSP).

6. The method of claim 1 wherein the LTE signal portion includes an orthogonal frequency division multiplexing (OFDM) symbol.

7. The method of claim 1 wherein the shared bus includes a Serial Rapid Input/Output (SRIO) bus.

8. The method of claim 1 wherein the trigger signal includes a Serial Rapid Input/Output (SRIO) write command.

9. The method of claim 1 wherein the decoded control information includes decoded downlink control information (DCI).

10. A system comprising:
a long term evolution (LTE) multi-user equipment (multi-UE) simulator device comprising,
a first module configured for receiving LTE downlink data from a radio interface, dividing the LTE downlink data into a plurality of LTE subframe signal portions, transmitting one of a plurality of the LTE subframe signal portions at the beginning of a first transmission interval, and for transmitting a trigger signal upon completing the transmission of the LTE subframe signal portion;
a second module configured for receiving the one of the plurality of LTE subframe signal portions over a shared bus; and
a third module configured for receiving the trigger signal over the shared bus and for forwarding, during an idle time period within the first transmission interval and after the completed transmission of the LTE signal portion, decoded control information associated with at least one of the LTE subframe signal portions to the second module, wherein the idle time period is defined by the sending of the trigger signal and the beginning of a second transmission interval initiated at the end of the first transmission interval, and wherein the trigger signal and the decoded control information are communicated separately from the plurality of LTE subframe signal portions.

11. The system of claim 10 wherein the second module is further configured for sending, to the third module over the shared bus, encoded downlink information to be processed into the decoded control information.

12. The system of claim 10 wherein the first module includes a common public radio interface (CPRI) field programmable gate array (FPGA).

13. The system of claim 10 wherein the second module includes a downlink signal chain field programmable gate array (FPGA).

14. The system of claim 10 wherein the third module includes a control digital signal processor (DSP).

15. The system of claim 10 wherein the LTE signal portion includes an orthogonal frequency division multiplexing (OFDM) symbol.

16. The system of claim 10 wherein the shared bus includes a Serial Rapid Input/Output (SRIO) bus.

17. The system of claim 10 wherein the trigger signal includes a Serial Rapid Input/Output (SRIO) write command.

18. The system of claim 10 wherein the decoded control information includes decoded downlink control information (DCI).

19. A non-transitory computer readable medium comprising computer executable instructions embodied in a computer readable medium that when executed by a processor of a computer control the computer to perform steps comprising:
- in a long term evolution (LTE) multi-user equipment (multi-UE) simulator device,
  - receiving, at a first module, LTE downlink data from a radio interface;
  - dividing the LTE downlink data into a plurality of LTE subframe signal portions;
  - transmitting, from a first module to a second module over a shared bus, one of the plurality of LTE subframe signal portions at the beginning of a first transmission interval;
  - sending, from the first module to a third module over the shared bus, a trigger signal upon completing the transmission of the LTE signal portion; and
- forwarding, from the third module to the second module over the shared bus during an idle time period within the first transmission interval and after the completed transmission of the LTE signal portion, decoded control information associated with at least one of the plurality of LTE subframe signal portions, wherein the idle time period is defined by the sending of the trigger signal and the beginning of a second transmission interval initiated at the end of the first transmission interval, and wherein the trigger signal and the decoded control information are communicated separately from the plurality of LTE subframe signal portions.

* * * * *